(12) United States Patent
Delorme et al.

(10) Patent No.: US 8,683,941 B2
(45) Date of Patent: Apr. 1, 2014

(54) ARTICULATED NOZZLE

(75) Inventors: Jean-Claude Delorme, Mirefleurs (FR); Christophe Ougier, Le Crest (FR)

(73) Assignees: Michelin Recherche et Technique S.A., Granges-Paccot (CH); Compagnie Generale des Etablissments Michelin, Clermont-Ferrand (FR)

( * ) Notice: Subject to any disclaimer, the term of this patent is extended or adjusted under 35 U.S.C. 154(b) by 771 days.

(21) Appl. No.: 12/599,448

(22) PCT Filed: Apr. 10, 2008

(86) PCT No.: PCT/EP2008/054360
§ 371 (c)(1),
(2), (4) Date: Oct. 26, 2010

(87) PCT Pub. No.: WO2008/141871
PCT Pub. Date: Nov. 27, 2008

(65) Prior Publication Data
US 2011/0052827 A1    Mar. 3, 2011

(30) Foreign Application Priority Data

May 11, 2007 (FR) ..................... 07 03434

(51) Int. Cl.
*B05B 3/00* (2006.01)
*B05C 3/02* (2006.01)
*B05C 1/06* (2006.01)
*B05C 5/00* (2006.01)
*B29D 30/00* (2006.01)
*B29D 30/08* (2006.01)

(52) U.S. Cl.
USPC ........... 118/323; 118/304; 118/259; 118/413; 156/117; 156/397; 156/909

(58) Field of Classification Search
USPC ......... 118/300, 304, 323, 410, 259, 263, 413; 156/405.1, 500, 909, 117, 130, 397, 156/406.4, 244.27, 246
See application file for complete search history.

(56) References Cited

U.S. PATENT DOCUMENTS

| 3,940,226 | A | 2/1976 | Verhoeven | |
|---|---|---|---|---|
| 5,162,070 | A | 11/1992 | Meyer | |
| 5,171,394 | A | 12/1992 | Laurent | |
| 5,342,473 | A | 8/1994 | Bibona et al. | |
| 5,458,727 | A | 10/1995 | Meyer | |
| 7,399,363 | B2 * | 7/2008 | Clifford et al. | 118/323 |
| 2004/0115360 | A1 * | 6/2004 | Clifford et al. | 427/421 |
| 2005/0189061 | A1 | 9/2005 | Kudo et al. | |

FOREIGN PATENT DOCUMENTS

| AT | 399 497 | 5/1995 |
|---|---|---|
| DE | 102 28 372 | 2/2003 |
| EP | 0 264 600 | 4/1988 |
| EP | 0 524 092 | 1/1993 |
| EP | 1 211 050 | 6/2002 |
| EP | 1 418 043 | 5/2004 |
| EP | 1 749 648 | 2/2007 |
| WO | WO 2006/035263 | 4/2006 |

\* cited by examiner

*Primary Examiner* — Yewebdar Tadesse
(74) *Attorney, Agent, or Firm* — Cozen O'Connor

(57) ABSTRACT

Device for applying a strip (B) of a viscoelastic material to a receiving surface (S) in relative motion (R) relative to said device, comprising a feed means and an application nozzle (1) having a body (11), into which said feed means (2) emerges, and a head (12) at the end of which there is an outlet orifice (122) of elongate shape in the transverse direction to the direction of the relative motion when the device is operating. The head (12) of the application nozzle (1) is linked to the body (11) of the application nozzle (1) via an articulation (10) which can be deformed along an axis (AA') perpendicular to the direction of application of the strip (B).

10 Claims, 4 Drawing Sheets

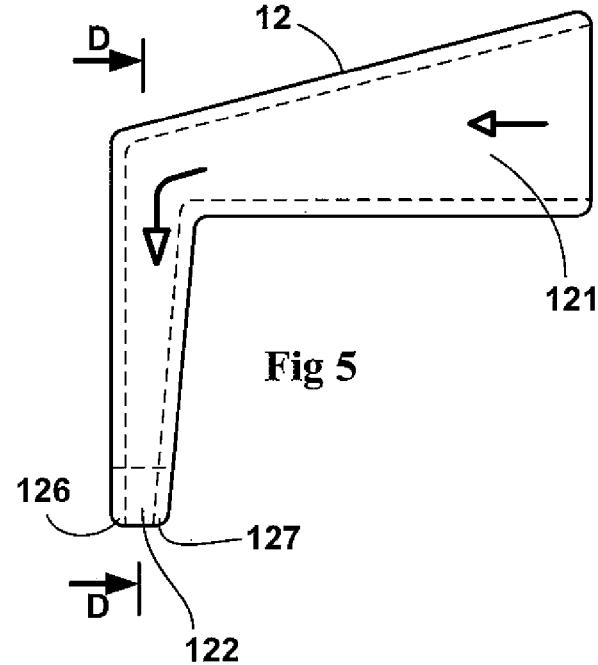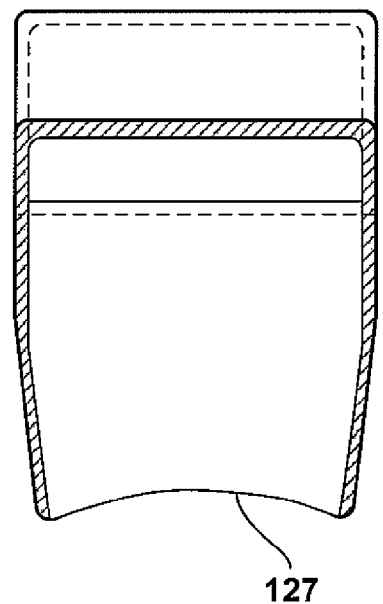

ARTICULATED NOZZLE

RELATED APPLICATIONS

This is a U.S. national stage under 35 USC §371 of application No. PCT/EP2008/054360, filed on Apr. 10, 2008.

This application claims the priority of French application no. 07/03434 filed May 11, 2007, the entire content of which is hereby incorporated by reference.

FIELD OF THE INVENTION

The invention relates to the field of manufacture of products based on viscoelastic materials such as plastic or elastomeric materials.

More particularly, the invention addresses the field of the placement of profiled elements in the form of strips overlaid one on top of the other according to a pitch and a coverage rate that are determined according to the final profile that is required.

BACKGROUND OF THE INVENTION

Typically, this well-known type of placement is used in the production of a tire blank, during which a strip of a product of rubbery nature is wound around a receiving surface of cylindrical or toroidal form, according to a very precise pitch, so as to form, by superposition of the layers of strips of one and the same quality, a profiled element of rubber of a given quality and positioned accurately according to the place occupied by this profiled element in the tire.

The known assembly means and devices generally comprise four types of means operating in collaboration with one another:
 a receiving surface,
 a feed means for generating a strip according to a defined geometry,
 a means of applying the strip on a receiving surface and,
 a means of controlling the displacement of the application means relative to the receiving surface.

As an example, the devices described in the publication EP 268 544 or even in the publication EP 264 600 disclose all the means discussed hereinabove.

The devices of this type make it possible to do away with the production steps for said profiled elements, which are generally performed from centralized production means. In practice, the strip is produced on demand at the moment of assembly. For a given strip profile, the final profile deposited on the receiving surface depends only on the algorithm used to control the application means and on the section of the strip. Also, the versatility of use of these methods is the reason why they are in widespread use.

The implementation of this type of method relies mainly on the quality of the strip generation means. It is in fact important for the section of the strip to be as close as possible to the desired benchmark, so that the quantity of material deposited accurately corresponds to the expected quantity.

To this end, rubber profiled element generation means have been developed that make it possible to provide a strictly constant flow rate. This type of means is described, by way of example, in the publication EP 0 400 496 A1.

Also, the shape of the profile needs to be chosen wisely to enable the layers of strips to be joined together as perfectly as possible, in order to avoid, as far as possible, the inclusion of air between the layers of strips, whose presence would be prejudicial to the resistance of the tire in use.

Also, it has been proposed to produce strips of roughly lenticular section so as to avoid the edge effects.

Furthermore, for the quality of deposition of the strip to be optimal, and to facilitate the application and the jointing of the strip on the receiving surface, it is important for the application means to be positioned as close as possible to the receiving surface.

To this end, the known devices have means making it possible to bring the assembly consisting of the feed means which are joined to the application means towards the receiving surface. The weight of this assembly of means is relatively high. The result of this is that it is difficult to finely and accurately control the position of the application means relative to the receiving surface, so that the application means can hug all the irregularities of the receiving surface. Also, in a known manner, it is proposed to arrange an application roller downstream of the application means. A device of this type is disclosed, by way of example, in the publication EP 264 600 already mentioned hereinabove. This application roller exerts a controlled pressure at the point where the strip is placed in contact on the receiving surface.

However, it is observed that this roller, which is generally mounted on the application means, represents a source of problems. It appears in effect that the strip adheres to the surface of the roller, or escapes into the free space between the application means and the roller which leads to a deformation or even a breaking of the strip, and to interruptions in the production cycle.

SUMMARY OF THE INVENTION

An object of the invention is to eliminate the above-identified drawbacks.

According to one aspect of the invention, a device for applying a strip to a viscoelastic material of a receiving surface in relative motion relative to said device comprises an application nozzle and a feed means. The application nozzle has a body, into which the feed means emerges, and a head at the end of which there is an outlet orifice.

This device is characterized in that the head of the application nozzle is linked to the body of the nozzle via an articulation which can be deformed along an axis roughly parallel to the receiving surface and perpendicular to the direction of application of the strip.

Another aspect of the invention relates to a method of implementing the device described hereinabove.

Thus, by having an articulation between the head and the body of the nozzle, and because of the very low weight of said head, it is possible to have the head of the nozzle almost instantaneously follow the irregularities of the receiving surface.

To this end, a force can usefully be exerted directly onto the head of the nozzle so as to apply the outlet orifice against the receiving surface in motion, so that the material is deposited directly on the receiving surface at its outlet of the orifice without there being a need to place a roller for applying the strip on the receiving surface.

The feed means can be a means of the screw extrusion tool type, with suitable flow rate and pressure conditions, or, preferably, a feed means of volumetric type, able to deliver the material at a determined and constant volumetric flow rate.

BRIEF DESCRIPTION OF THE DRAWINGS

FIGS. 5 and 6 represent a particular form of the profile of the head of the nozzle at the outlet orifice level.

DETAILED DESCRIPTION OF THE DRAWINGS

Figure 1:
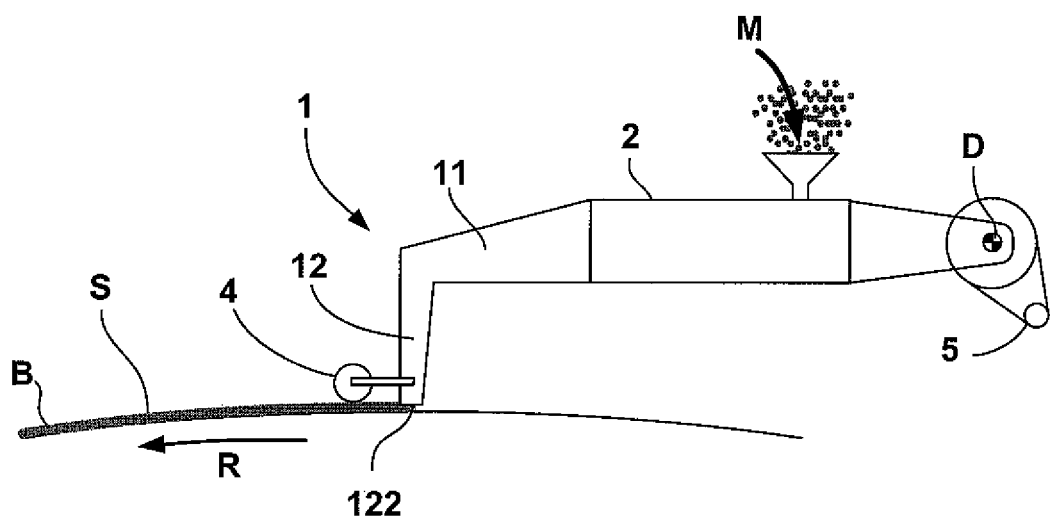
FIG. 1 represents a diagrammatic view of a device according to the prior art.

The device according to the known prior art represented diagrammatically in FIG. 1 comprises a feed means 2 into which the viscoelastic material M is introduced so as to feed a nozzle 1 with a given feed flow rate and pressure. The receiving surface S is in motion relative to the application device in a direction R. The mixture deposited on the receiving surface forms a strip B. An application roller 4 can be positioned downstream of the material outlet orifice 122. In this device, the nozzle and the feed means form an assembly that is integral and mobile about an axis C under the action of a motorized means 5.

Figure 2:
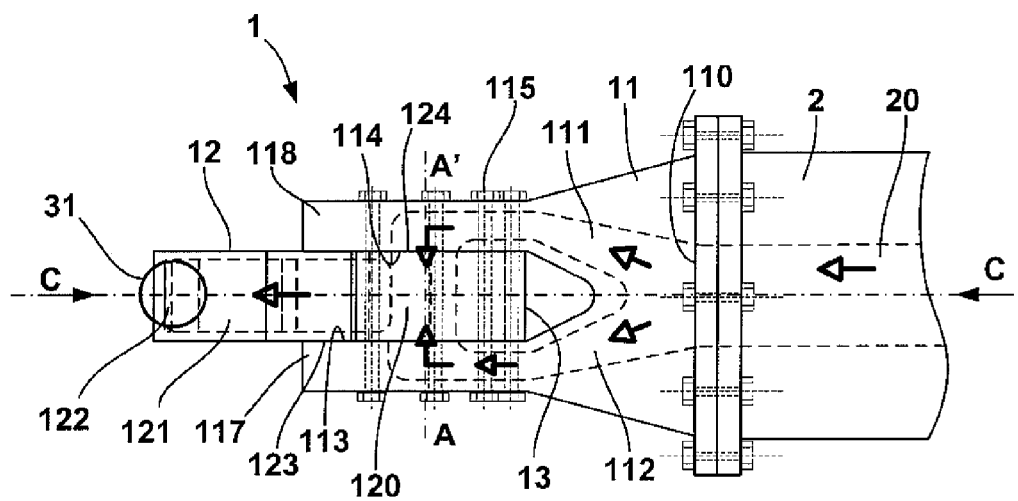
FIG. 2 represents a diagrammatic plan view of an application nozzle according to an embodiment of the invention.
Figure 3:
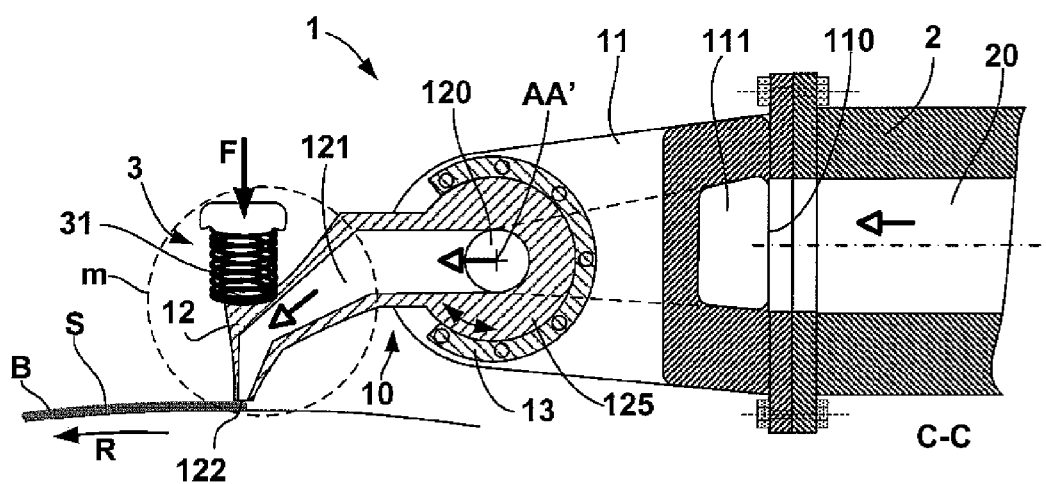
FIG. 3 represents a diagrammatic view in transverse cross section along line C-C of a nozzle according to the embodiment of the invention shown in FIG. 2.

The application device illustrated in FIGS. 2 and 3 comprises a feed means 2 (not represented), the outlet channel 20 of which emerges in the inlet 110 of the body 11 of the application nozzle 1.

According to the preferred implementation of the invention, the body 11 of the nozzle 1 is divided into two branches, respectively 117 and 118, passed through by the feed channels, respectively 111 and 112. The articulation 10 of the head 12 relative to the body of the nozzle 11 is placed between the two branches 117 and 118 of the body 11 of the nozzle 1.

The articulation 10 of the head 12 comprises a cylindrical hub 125 mounted so as to rotate in a semi-circular clamp 13, maintained fixed relative to the body 11. The semi-circular clamp 13 and the application head 12 are mounted between the two branches 117 and 118 of the body 11 of the nozzle 1, so that the head 12 of the nozzle 1, guided by the semi-circular clamp 13, rotates freely about an axis AA' roughly parallel to the plane formed by the receiving surface, and perpendicular to the direction of progress R. The head 12 of the nozzle 1 can rotate over the angular portion corresponding to the open part of the clamp 13.

The two flat lateral faces, respectively 123 and 124, of the cylindrical hub 125, form a leaktight contact with the two internal flat surfaces, respectively 113 and 114, of the two branches, respectively 117 and 118, of the body 11.

Clamping screws 115 maintain the parts and the pressure between the flat faces of the hub (123, 124) and the internal flat surfaces (113, 114) of the branches (117, 118) of the body 11.

The dynamic leak-tightness between the surfaces of the hub (123, 124) and the internal surfaces of the branches (113, 114) of the body 11 is ensured by a mirror system, in which the surface states have been adapted and correspond to the clearances and to the surface states commonly used in general mechanics.

The channels 111 and 112 emerge respectively at the two ends of a channel of roughly cylindrical form 120, the axis of which is aligned with rotation axis AA' of the hub 125 of the application head 12 in the semi-circular clamp 13.

The head of the nozzle includes an inner channel 121, for connecting the channel 120 and the orifice 122 placed at the end of the head of the nozzle. The orifice 122 has an elongate form in the direction transverse to the relative motion R between the receiving surface S and the application device.

The direction of circulation of the viscoelastic material in the nozzle 1 is identified by the arrows with open heads.

A means 3 is used to exert a force F on the head 12 of the nozzle 1, so as to force the orifice 122 to come into contact with the receiving surface S by rotating the head 12 about the axis AA'. Because of its very low weight, the head thus remains in contact with the receiving surface regardless of the irregularities of that surface. It follows that the strip B deposited on the receiving surface is applied directly by the lips of the outlet orifice 122.

The means for applying the force F on the head of the nozzle can be, without distinction, a spring, or even a controlled-pressure jack or any other equivalent means. Care will be taken nevertheless to ensure that the inertia of the assembly is not too great for the reasons stated hereinabove.

In practice, the application force is relatively modest, and lies within a range of the order of 100 to 500 N, when the material used is rubber.

The assembly of the preferred embodiment of the invention, described hereinabove and presented in FIGS. 2 and 3, is proposed here by way of example, and is illustrated by its compactness, its lightness and its ease of assembly. Other assemblies, just as efficient, can be produced by those skilled in the art by, for example, arranging the articulation on one of the lateral faces on the body 11 of the nozzle, which makes it possible to avoid the separation of the flow within the body of the nozzle. Similarly, it is possible to form openings in the rear portion of the hub in order to directly connect the inner channels of the body 11 of the nozzle and of the head 12.

As stated hereinabove, the device according to the invention makes it possible to apply the strip on the receiving surface without it being necessary to use an application roller placed downstream of the nozzle.

It is in fact observed that the dynamic pressure exerted by the viscoelastic material on the receiving surface S depends essentially on its outlet speed from the orifice 122, on the distance separating the outlet orifice from the receiving surface, and on the density and the viscosity of the material. Also, for a given material, it will be arranged for the section of the outlet orifice to be adapted to the flow rate of the feed means available, so as to obtain a sufficient outlet speed to generate a dynamic pressure.

The action of the head of the nozzle on the material is exerted via the edges of the orifice of the nozzle, which, combined with the relative speed of the device relative to the receiving surface, has the effect of favouring the action of smoothing and shaping the deposited material. In particular, as will be seen hereinbelow, the form of the edge of the orifice placed downstream, gives the strip the desired form.

The effect of the dynamic pressure is to make the strip adhere to the receiving surface, but also to pushback the head of the nozzle of said surface. The force exerted by the means 3 on the head has the effect of bringing the head towards the surface. It follows that the geometric irregularities of the receiving surface have very little influence on the device.

In fact, these irregularities, such as localized depressions, or even junctions of products deposited previously on the receiving surface, simply have the effect of varying the distance between the orifice of the nozzle and the receiving surface, which provokes a variation of the dynamic pressure which is immediately compensated by the action of the force exerted on the head of the nozzle. This makes it possible to consider the device to be self-adaptive, and this property makes it possible to obtain a stability of the geometry and of the volume of material deposited which is remarkable, in particular when the nozzle is linked to a feed means of volumetric type.

By increasing the feed flow rate, the outlet speed is increased, and, for a force applied on the nozzle head that is constant, the nozzle is moved away from the receiving surface, which has the effect of increasing the section of the deposited strip. When the flow rate reduces, the head of the nozzle moves towards the receiving surface until the dynamic pressure is balanced by the force exerted on the head of the nozzle, which has the effect of reducing the section of the strip.

This possibility can be judiciously exploited because of the low inertia of the head of the nozzle and its strong sensitivity to the dynamic forces. Thus, for a given relative speed of the receiving surface relative to the application device, and by adjusting the extrusion flow rate, the section of the strip can be varied. Thus, the section of the strip will be increased to construct the fill areas, and the section of the strip will be reduced in the areas where a finer definition of the profile is needed, in particular in the final phase of construction of the profiled element.

If the relative speed of the receiving surface relative to the application device is increased, while keeping the flow rate and the application force constant, the section of the strip is reduced.

Given constant volumetric flow rate and for a relative speed of the receiving surface relative to the application device that is constant, by varying the application force using a controllable means, it can be seen that the smoothing effect conferred by the lateral edges and by the rear longitudinal edge 127 varies. This effect is particularly important, inasmuch as it makes it possible to join the strip more or less effectively with the products deposited previously on the surface of the drum. The smoothing action by the rear edge 127 somewhat replaces the action of the application roller used in the methods known from the prior art and discussed in the introduction to this description.

FIGS. 5 and 6 illustrate a preferred embodiment of the profile of the outlet 122 placed at the end of the head 12 of the nozzle 1, and as per inset m of FIG. 3. The rear edge 127 of the orifice 122 has a concave form when the head 12 of the nozzle 1 is observed in projection in a plane perpendicular to the direction of progress R. When the head of the nozzle is brought towards the receiving surface, this edge 127 defines, together with the receiving surface, a substantially lenticular profile.

The device described hereinabove is particularly well suited to producing a tire blank by stacking strips. Consequently, the elastomeric material preferably will be of a rubbery nature. The receiving surface will comprise the blank of a tire during production, the form of which is generally cylindrical or toroidal.

Figure 4:
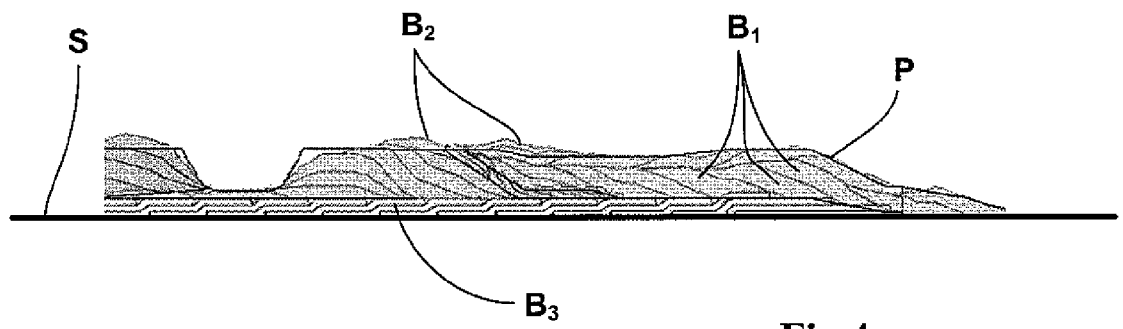
FIG. 4 represents a diagrammatic view in transverse cross section of a profiled element deposited on a receiving surface, and formed by a superposition of strips.

The profiled element obtained in this particular case of implementation of the method, and which applies to the production of a tire, is detailed in FIG. 4 which represents a profiled element P produced by the deposition of successive layers, superimposed one on top of the other, of strips wound around a rotating cylindrical receiving surface. It can be seen that it is possible to produce a number of strip profiles by varying the volumetric flow rate of the feed means ($B_1$ and $B_2$) or by modifying the form of the profile of the rear edge 127 ($B_3$).

The strip $B_1$ is obtained by increasing the volumetric flow rate, which makes it possible to reduce the production time of the "fleshy" part of the profiled element P. By reducing the volumetric flow rate, the section of the strip $B_2$ is reduced, which makes it possible to more accurately produce the outer contour of the profiled element P.

The invention claimed is:

1. A device for applying a strip of a viscoelastic material to a receiving surface in relative motion relative to the device, comprising:
    a feed means; and
    an articulated application nozzle having an internal channel therethrough, the application nozzle having:
        (i) a body, into which said feed means emerges, and
        (ii) a head, rotatably movable with respect to the body, the end of the head having an outlet orifice and means for exerting a force on the head of the articulated application nozzle so as to force the outlet orifice to come into contact with the receiving surface,
    wherein the head of the articulated application nozzle is linked to the body of the application nozzle via an articulation defined by a rotating mechanism provided between a portion of the internal channel in the body and a portion of the internal channel in the head, the body, the head and the rotating mechanism cooperating to permit rotational deformation of the head with respect to the body along an axis roughly parallel to the receiving surface and perpendicular to the direction of application of the strip.

2. The device according to claim 1, in which a duct, in which the viscoelastic material circulates inside the head of the articulated application nozzle, is linked to the duct in which said material circulates inside the body of the articulated application nozzle by a channel, the axis of which is the same as the axis of the articulation.

3. The device according to claim 1, wherein the force exerted by the means for exerting a force on the head of the articulated application nozzle has a component of predetermined value, that is roughly perpendicular to the receiving surface at the point of application of the articulated application nozzle, when the outlet orifice is situated in immediate proximity to the receiving surface, and is facing said receiving surface.

4. The device according to claim 2, wherein the means for exerting a force on the head of the articulated application nozzle exert a constant force.

5. The device according to claim 2, wherein the means for exerting a force on the head of the articulated application nozzle exert a force whose intensity can be controlled.

6. The device according to claim 1, wherein the feed means is configured to deliver the material with a constant volumetric flow rate.

7. A method of applying a strip of a viscoelastic material on a receiving surface in which the receiving surface is in relative motion relative to an application device according to claim 1.

8. The application method according to claim 7, wherein the feed flow rate is varied to vary the section of the strip deposited on the receiving surface.

9. The application method according to claim 7, wherein the viscoelastic material is non-vulcanized rubber.

10. The application method according to claim 9, wherein the receiving surface is formed by a rotating tire blank.

* * * * *